(12) United States Patent
Kurzeja et al.

(10) Patent No.: US 6,685,569 B2
(45) Date of Patent: Feb. 3, 2004

(54) VIBRATION ABSORBING UNIVERSAL JOINT

(75) Inventors: Patrick Kurzeja, White Lake, MI (US); Ronald N. Brissette, Lake Orion, MI (US); Jim Hawkins, Madison, AL (US); Chris Keeney, Troy, MI (US); Christos Kyrtsos, Southfield, MI (US); Jack Darrin Oates, Fletcher, NC (US); Tom Sanko, Troy, MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 163 days.

(21) Appl. No.: 09/783,466

(22) Filed: Feb. 14, 2001

(65) Prior Publication Data

US 2002/0111218 A1 Aug. 15, 2002

(51) Int. Cl.⁷ .................................................. F16D 3/28
(52) U.S. Cl. ......................... 464/70; 464/128; 464/132
(58) Field of Search .................. 464/70, 132, 127–131, 464/133, 134, 136, 89, 135; 384/582

(56) References Cited

U.S. PATENT DOCUMENTS

| | | | |
|---|---|---|---|
| 1,943,814 A | * | 1/1934 | Cutting ........................ 464/70 |
| 1,985,531 A | | 12/1934 | Swenson |
| 2,024,777 A | * | 12/1935 | Neumann .................... 464/89 |
| 3,178,907 A | * | 4/1965 | Lyons ........................ 464/130 |
| 3,423,958 A | | 1/1969 | Koelling |
| 3,481,159 A | * | 12/1969 | Kayser ........................ 464/70 |
| 3,545,232 A | * | 12/1970 | Neese et al. ............ 464/128 X |
| 3,645,115 A | | 2/1972 | Shotwell et al. |
| 6,015,349 A | * | 1/2000 | Okada et al. |

FOREIGN PATENT DOCUMENTS

| DE | 26 01 026 | * | 7/1977 | .................. 464/70 |

OTHER PUBLICATIONS

ISP, International Seal & Packing Co., Inc., Catalogue 300, Berlin, NJ, Dec. 1997, p. iii.*

* cited by examiner

Primary Examiner—G. Binda
(74) Attorney, Agent, or Firm—Carlson, Gaskey & Olds

(57) ABSTRACT

An universal joint dissipates shock and reduces torsional vibration to the elements of the universal joint. An elastomeric material, such as a polyurethane, is introduced between the bores of the yokes of the joint and the respective adjacent bearing cups that are mounted on the shafts of the cross bar.

9 Claims, 1 Drawing Sheet

VIBRATION ABSORBING UNIVERSAL JOINT

BACKGROUND OF THE INVENTION

The present invention relates to universal joints with a shock absorbing material between the yokes and the respective bearings.

Modern vehicles are often equipped with universal joints that comprise a cross member having four shafts or trunions that lie in a same plane. Bearings are mounted on each shaft, and two yokes are mounted on opposed pairs of shafts. The yokes are mounted at positions spaced ninety degrees relative to each other and are connected to drive shafts. This arrangement allows rotation to be transmitted through varying angles between the drive shafts. This type of universal joint is particularly popular in heavy duty vehicles such as trucks.

Universal joints experience a great deal of stress and vibration and are exposed to a hostile environment on the underside of a vehicle. Thus, the connection between the yoke and respective bearings should have the ability to withstand imposed shocks and torsional vibrations. The universal joint designs utilized in the past have not always achieved this goal for yoke and cross member connections.

Typically, universal joints use yokes that have cylindrical bores to receive a bearing cup and shaft. The cylindrical bore surrounds and supports the bearing cup during operation of the universal joint. The yokes and bearing cups are typically formed of rigid metals.

One problem with this arrangement is that the bearings are rigidly aligned and fitted to the cylindrical bores of the yokes. This results in a high degree of shock transmission which, in turn, causes undesirable vibrations to the elements of the universal joint.

It has been proposed to use resilient materials to form the bearings. However, such bearings do not provide adequate support.

It is an object of the present invention to address this problem by providing a conventional universal joint with a system for absorbing shocks imposed during usage. Such a system would significantly reduce undesirable torsional vibrations and ultimately lengthen the life span of the elements of the universal joint.

SUMMARY OF THE INVENTION

In a disclosed embodiment of the present invention, a conventional universal joint is provided with a shock absorbing system. This system is designed to dissipated imposed shock on the universal joint, in particular between the yoke and respective bearings. This is accomplished by introducing a shock absorbing elastomeric material between an exterior surface of the universal joint bearing cup and the interior surface of the cylindrical bore of the respective yoke. The shock absorbing elastomeric material may be any of a known suitable substance, such as a polyurethane with acceptable toughness. The shock absorbing elastomeric material acts to "cushion" the connective areas between the cylindrical bore of a yoke and the exterior of the respective universal joint bearing cups. The bearing cups and the yoke are both formed of metal and the shock absorbing material is more resilient than the material of the bearing cups and the yoke. Thus, the "cushioning" in the connective area serves as a self aligning and load distributing shock absorbing system.

These and other features of the present invention can be best understood from the following specification and drawings, the following of which is a brief description.

DETAILED DESCRIPTION OF A PREFERRED EMBODIMENT OF THE INVENTION

Figure 1:
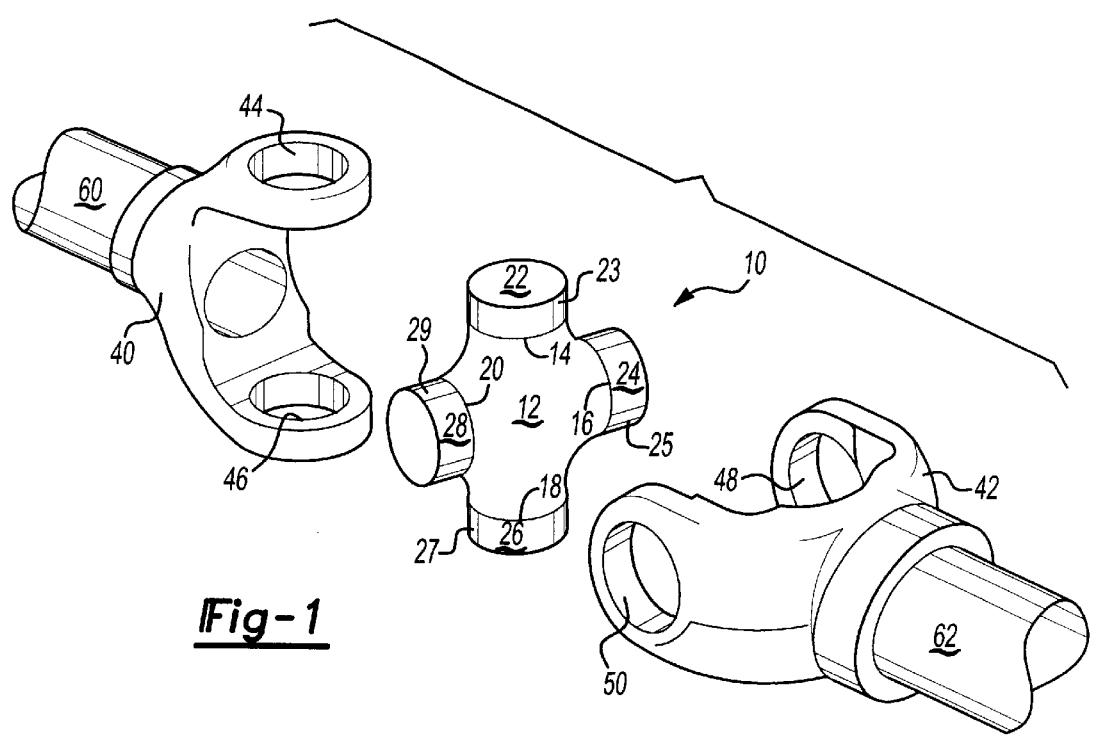
FIG. 1 is an exploded perspective view of a universal joint.

As shown in the exploded perspective view in FIG. 1, universal joint 10 comprises cross member 12 and a pair of yokes 40, 42. Cross member 12 has four trunions 14, 16, 18, 20, that all lie in a same plane as each other. Each trunion 14, 16, 18, 20 has a respective set of bearings by way of bearing cups 22, 24, 26, 28 mounted thereupon. The two yokes 40, 42 are mounted on opposed pairs of trunions. That is, yoke 40 is mounted on opposing trunion pair 16, 20 and yoke 42 is mounted on opposing trunion pair 14, 18. Yokes 40 and 42 are mounted at positions spaced ninety degrees from each other and are connected to respective drive shafts 60 and 62. Thus, movement of the universal joint 10 allows rotation to be transmitted through a variety of angles between the drive shafts 60, 62.

As can be seen from FIG. 1, each bearing cup 22, 24, 26, 28 has a respective outer cylindrical surface 23, 25, 27, 29. Yoke 40 has a pair of cylindrical bores for mounting on outer cylindrical surfaces 25, 29 of bearing cups 24 and 28 respectively. Concurrently, yoke 42 has a pair of cylindrical bores 48, 50 for mounting on outer cylindrical surfaces 23, 27 of bearing cups 22 and 26 respectively. The points of connection between cylindrical bores 44, 46, 48, 50 and respective outer cylindrical bearing cup surfaces 25, 29, 23, 27 receive the shock absorbing material in accordance with the present invention, as described as follows with reference to FIG. 2. The bearing cups and yoke are formed of a rigid metal, and the shock absorbing material is more resilient than the bearing cup or yoke.

With respect to the schematic cross sectional view of FIG. 2, for the sake of simplicity, the shock absorbing system of the present invention shall be described with reference to one yoke and one respective pair of opposed trunions. It should be understood that the description also applies to the second yoke and the second respective pair of opposed trunions.

Figure 2:
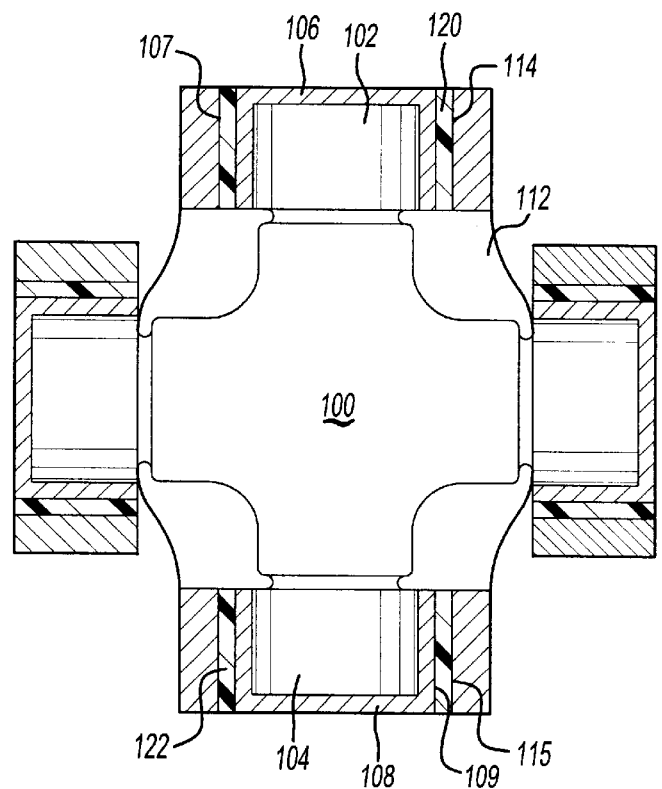
FIG. 2 is a schematic cross sectional view of a universal joint incorporating the shock absorption system of the present invention.

As shown in FIG. 2, cross member 100 includes an opposing pair of trunions 102, 104. A bearing cup 106, 108 respectively caps each trunion 102, 104. Each bearing cup 106, 108 has a respective outer cylindrical surface 107, 109. Yoke 112 is provided with a pair of cylindrical bores 114, 115 mounted on opposing bearing cups 106, 108. Seated between the outer cylindrical surface 107, 109 of each bearing cup 106, 108 and each cylindrical bore 114, 115 of yoke 112 are shock absorbing elements 120, 122.

As is clear from FIG. 2, the elastomeric sleeves 120, 122 prevent contact between the outer periphery of the bearing cups 106, 108 and the inner periphery of the bores in the yokes 112. Further, as is also clear, the elastomeric sleeves 120 and 122 do not extent beyond the axial length of the bearing cup.

Shock absorbing elements 120, 122 are cylindrical and are designed using any of a known suitable elastomeric material such as a tough polyurethane. The shock absorbing elements 120, 122 provide a "cushioning" function to the connective areas between each cylindrical bore 114, 115 of yoke 112 and each respective outer cylindrical surface 107, 109 of bearing cups 106, 108. Thus, the shock absorbing elements 120, 122 provide self alignment and shock load distribution for the universal joint elements.

Notably, the yokes as illustrated in this application are "full round" type yokes. That is, the cylindrical bores are defined by integral surfaces. However, some universal joint yokes have "wing bearings", which are portions bolted together and each defining half of the bore. For the present invention, the term "bore" or "cylindrical bore" in reference to the yoke would refer to either the full round or the wing bearing type.

Further, while the present invention shows the shock absorbing material to be positioned between each of the bearing cups and each of the yokes, it should be understand that the invention would extend to an arrangement where less than all of the bearing cups incorporate the shock absorbing material. However, it is preferred that the shock absorbing material is positioned between each of the bearing cups and their respective yoke bores.

A preferred embodiment of this invention has been disclosed. However, a worker of ordinary skill in this art would recognize that certain modifications would come within the scope of this invention. For that reason, the following claims should be studied to determine the true scope and content of this invention.

What is claimed is:

1. A universal joint comprising:
   a cross member having two opposed pairs of trunions all lying in a same plane, each trunion having a bearing cup mounted thereupon;
   a pair of yokes each having a pair of bores for mounting each of said yokes to each of said opposed pairs of trunions by way of said bearing cup mounted thereupon at positions spaced ninety degrees relative to each other; and
   a shock absorbing system for dissipating shock and torsional vibration between at least one of said yokes and at least one of said bearing cups, said shock absorbing system including an elastomeric cylindrical element positioned between an outer peripheral surface of said bearing cup and an inner peripheral surface of said yoke, said cylindrical elastomeric member preventing contact between said radially outer periphery of said bearing cup and said inner periphery of said yoke bore, and said cylindrical elastomeric member not extending beyond the axial extent of said bearing cup.

2. A universal joint as recited in claim 1, wherein a connective area is defined between said outer surfaces and said bores of the yokes, and said shock absorbing system is positioned in said connective area.

3. A universal joint as recited in claim 1, wherein said elastomeric material is a polyurethane.

4. A universal joint as recited in claim 1, wherein said bores and said yokes are full bores formed by an integral yoke portion.

5. A universal joint as recited in claim 1, wherein all four of said bearing cups and their respective bores and said yokes receive a shock absorbing system.

6. A universal joint as recited in claim 1, wherein said cylindrical sleeve has a cylindrical inner bore, said cylindrical inner bore closely receiving said outer peripheral surface of said bearing cup, such that said bearing cup has an end cross-sectional area which does not align with a portion of said cylindrical sleeve.

7. A universal joint comprising:
   a cross member having two opposed pairs of trunions all lying in a same plane;
   each trunion having a bearing cup mounted thereupon;
   a pair of yokes each having a pair of bores for mounting each of said yokes to each of said opposed pairs of minions by way of said bearing cup mounted thereupon at positions spaced ninety degrees relative to each other;
   said bearing cups each having an outer peripheral surface such that a connective area is defined between said outer peripheral surfaces and said bores of the yokes; and
   a shock absorbing cylindrical elastomeric element positioned in said connective areas for dissipating shock and torsional vibration imposed on said universal joint, said shock absorbing system including an elastomeric cylindrical element positioned between said outer peripheral surface of said bearing cups and an inner peripheral surface of said yoke, said cylindrical elastomeric member preventing contact between said radially outer periphery of said bearing cups and an inner periphery of said yoke bore, and said cylindrical elastomeric member not extending beyond the axial extent of said bearing cups.

8. A universal joint as recited in claim 7, wherein said elastomeric element is a polyurethane material.

9. A universal joint as recited in claim 7, wherein said bores and said yokes are provided by full bores defined by an integral yoke portion.

* * * * *

UNITED STATES PATENT AND TRADEMARK OFFICE
CERTIFICATE OF CORRECTION

PATENT NO.     : 6,685,569 B2
DATED          : February 3, 2004
INVENTOR(S)    : Kurzeja et al.

It is certified that error appears in the above-identified patent and that said Letters Patent is hereby corrected as shown below:

Column 4,
Line 25, "minions" should read as -- truions --

Signed and Sealed this

Twenty-seventh Day of April, 2004

JON W. DUDAS
*Acting Director of the United States Patent and Trademark Office*